(12) United States Patent
Aksit et al.

(10) Patent No.: US 6,378,371 B1
(45) Date of Patent: Apr. 30, 2002

(54) APPARATUS AND METHODS FOR DETERMINING NATURAL FREQUENCIES OF BRUSH SEALS

(75) Inventors: Mahmut Faruk Aksit; Mehmet Demiroglu, both of Troy; Hamid Reza Sarshar, Clfiton Park; Osman Saim Dinc, Troy, all of NY (US)

(73) Assignee: General Electric Company, Schenectady, NY (US)

( * ) Notice: Subject to any disclaimer, the term of this patent is extended or adjusted under 35 U.S.C. 154(b) by 18 days.

(21) Appl. No.: 09/672,486

(22) Filed: Sep. 29, 2000

(51) Int. Cl.[7] ............................................. G01H 13/00
(52) U.S. Cl. ........................ 73/579; 73/663; 73/865.6
(58) Field of Search ..................... 73/579, 593, 662, 73/663, 664, 665, 666, 667, 668, 865.3, 865.6

(56) References Cited

U.S. PATENT DOCUMENTS

| | | | |
|---|---|---|---|
| 3,664,181 A | * | 5/1972 | Conrad et al. ................. 73/571 |
| 4,603,587 A | * | 8/1986 | Kimball et al. ................ 73/663 |
| 4,912,980 A | * | 4/1990 | Baughn ........................ 73/663 |
| 5,014,000 A | * | 5/1991 | Schlagheck .................. 324/754 |
| 5,335,920 A | * | 8/1994 | Tseng et al. ................. 277/303 |
| 5,513,538 A | * | 5/1996 | Baker et al. .................. 73/663 |
| 5,637,812 A | * | 6/1997 | Baker et al. .................. 73/571 |
| 5,813,541 A | * | 9/1998 | Mottram ........................ 209/2 |

* cited by examiner

Primary Examiner—Hezron Williams
Assistant Examiner—Rose M. Miller
(74) Attorney, Agent, or Firm—Patrick K Patnode; Christian G. Cabou

(57) ABSTRACT

A brush seal segment is mounted within a pressure vessel and against an arcuate surface of an element to provide a seal between regions on opposite sides of the seal at different pressures. By vibrating the vessel through a range of frequencies, natural frequencies of the brush seal under pressure loading can be ascertained. Additionally, by adjusting interference between the arcuate surface and the bristle tips, natural frequencies of the brush seal under various interference loadings can likewise be ascertained. The pressure vessel has mounts for attaching the vessel to a shaker table to facilitate vibrating the vessel through the range of frequencies.

14 Claims, 1 Drawing Sheet

APPARATUS AND METHODS FOR DETERMINING NATURAL FREQUENCIES OF BRUSH SEALS

BACKGROUND OF THE INVENTION

This invention relates to frequency testing apparatus for determining the natural frequencies of brush seal segments under pressure and/or simulated rotor interference and methods therefor.

Brush seals are increasingly utilized in more challenging conditions such as large steam and gas turbines and aircraft engines to seal between stationary and rotary components. Brush seals typically comprise a plurality of bristles formed of ceramic or metal materials extending from one or more backing plates, terminating in free ends. A brush seal conventionally extends between components to be sealed, e.g., extending from a stationary component typically with the free ends of the bristles engaging the rotary component. Also, as conventional, the proximal ends of the bristles are disposed between a pair of backing plates and welded to the backing plates. The backing plates are typically secured, as noted, to the stationary component, for example, a diaphragm about a rotor in a steam turbine. The bristles extend from the backing plates typically at an angle offset from a radius of the rotor and in the direction of rotation of the rotor such that the free ends of the bristles engage the rotor and form a seal with the rotor. The bristles, in effect, comprise a plurality of cantilevered beams engaging along the surface of a rotating component. Brush seals sealing between a stationary component and a rotating component are also conventionally formed in brush seal segments. For example, six arcuate seal segments may be provided, each segment extending approximately 60° and arranged end-to-end to form a complete 360° seal about the rotating component.

As will be appreciated, severe flow conditions carry the risk of exciting one or more of the natural frequencies of the brush seal. In the event that a brush seal is excited during use at its resonant frequency, the bristles can break off adjacent their welded proximal ends, as well as along their free length, due to high-cycle fatigue. Because of this phenomenon, brush seal segments are typically tested in shaker tables to ascertain the natural frequencies of the seal, using stroboscopes to determine the natural frequencies of the brush seal segments as the frequencies are swept through. Because the bristles are packed one against the other in the seal, however, friction between the bristles themselves causes the natural frequency of the brush seal to change under various operating pressures, i.e., the differential pressure between regions on opposite sides of the seal. That is, as the pressure loading increases, bristles in engagement with one another and packed together, increase the seal stiffness, altering the natural frequencies of the seal.

Not only do the natural frequencies of the brush seal change under various pressure loadings but they also change as a function of rotor interference. That is, the force applied between the brush seal and the rotor also alters the natural frequencies of the seal. Accordingly, there is a need for apparatus and methods for testing brush seal segments to determine their natural frequencies under pressure loading and/or rotor interferences.

BRIEF SUMMARY OF THE INVENTION

In accordance with a preferred embodiment of the invention, a pressure vessel which can be pressurized to the selected operating pressure level anticipated for the brush seal is mounted on a shaker table which sweeps through the frequency range of interest. A brush seal segment, preferably only a small arcuate segment, is mounted within the pressure vessel. An element having a radius simulating a rotor against which the tips of the bristles will engage when the brush seal is placed in use is mounted within the pressure vessel whereby the brush seal segment and element form a simulated seal. The seal is arranged in the pressure vessel such that regions on opposite sides of the seal are at different pressures. Viewports are provided in the pressure vessel for use, for example, with stroboscopes, to determine the natural frequencies of the brush bristles as the shaker table sweeps through the frequencies of interest.

With this arrangement, the natural frequencies of the brush seal at the anticipated operating pressure differential across the seal can be ascertained. Additionally, by adjusting the radial surface of the element toward or away from the bristle tips, the level of interference between the bristles and simulated rotor can be varied. As a consequence, the natural frequencies of the brush seal segment can be ascertained under varying pressures and/or interference fits between the bristles and the simulated rotor.

In a preferred embodiment of the invention, natural frequency testing apparatus for a brush seal comprises an enclosure having a mount, and an arcuate brush seal segment carried by the mount. The brush seal segment includes a plurality of bristles carried on a backing plate, with the bristles extending freely therefrom, terminating in bristle tips. An element within the enclosure has an arcuate surface for engaging the bristle tips and, together with the brush seal segment, defines a seal between two regions on opposite sides of the seal at different pressures, respectively. A connection carried by the enclosure couples the enclosure to a shaker which vibrates the enclosure and the brush seal segment mounted therein through a range of frequencies to ascertain a natural frequency of the brush seal segment under the differential pressure loading. Alternatively, the brush seal segment includes a plurality of bristles carried on a pair of backing plates, with the bristles extending freely therefrom, terminating in bristle tips.

In a further preferred embodiment of the invention, a method of determining a natural frequency of a brush seal segment having a plurality of bristles mounted on at least one backing plate with the bristles extending freely therefrom and terminating in bristle tips, comprises the steps of disposing the brush seal segment in a pressure vessel with the bristle tips engaging along an element so as to define a seal therewith situated between regions on opposite sides of the seal at different pressures, respectively, affording a pressure differential across the seal, and shaking the pressure vessel through a range of frequencies for determining a natural frequency of the brush seal segment at the differential pressure.

In a still further preferred embodiment of the invention, a method of determining a natural frequency of a brush seal segment having a plurality of bristles mounted on at least one backing plate, with the bristles extending freely therefrom and terminating in bristle tips, comprises the steps of disposing the brush seal segment in a fixture with the bristle tips engaging along an element so as to define a magnitude of interference therewith, and determining a natural frequency of the brush seal segment at the magnitude of interference between the brush seal segment and element.

DETAILED DESCRIPTION OF THE INVENTION

Figure 1:
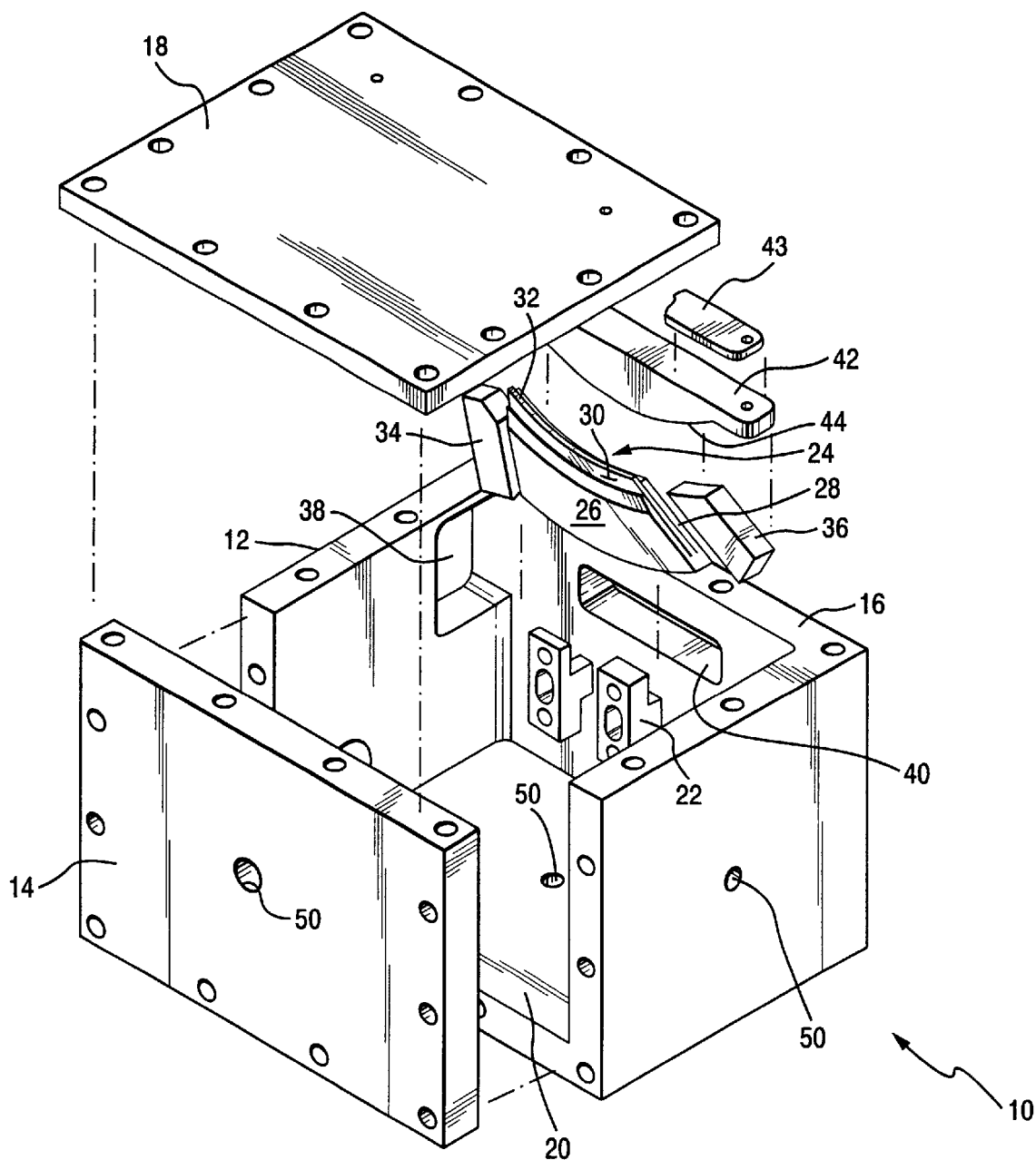
FIG. 1 is an exploded perspective view of a preferred embodiment of natural frequency testing apparatus for brush seals in accordance with a preferred embodiment of the invention.

In the drawing FIGURE, a pressure vessel or enclosure 10, having side walls 12, opposite end walls 14 and 16, a top wall 18 and a bottom wall 20, is illustrated. The walls define an enclosure which can be pressurized in a known conventional manner. Within the pressure vessel, a mount is provided, preferably comprising a pair of mounting brackets or clamps 22 disposed on end wall 16. Brackets 22 clamp a brush seal segment 24 within the enclosure for testing purposes. As illustrated, brush seal 24 includes a pair of backing plates 26 and 28, between which are disposed a plurality of bristles 30. The bristles are typically disposed between the backing plates and welded to the backing plates adjacent proximal ends, with the bristles extending freely from between the backing plates, terminating in bristle tips 32. It will be appreciated that the brush seal segment 24 may comprise one backing plate, although two backing plates are preferred.

Brush seal segment 24 is clamped by seal clamps 22 adjacent the interior face of wall 16. A pair of end supports 34 and 36 are also carried by end wall 16, sealing the ends of segment 24. End support 34 terminates short of the bristle tips such that the bristle tips can be observed through a viewport 38 formed in a side wall 12. End support 36 has an arcuate upper surface conforming generally to the radius of the bristle tips. It will be appreciated that the brush seal segment 24 forms an arcuate segment of an otherwise annular brush seal. The enclosure also includes an outlet 40 to ambient pressure through end wall 16.

An element 42 having a radius, i.e., an arcuate surface 44 simulative of a rotor surface, is supported along the underside of top wall 18. The arcuate surface is engaged with tips 32 of bristles 30. Element 42 thus projects into the enclosure and its arcuate surface 44 engages along tips 32 of the brush seal. By this engagement, and with end supports 34 and 36 substantially sealing the segment undergoing test, a pressure difference is created between regions on opposite sides of the seal formed by engagement of the bristle tips and surface 44. With the foregoing-described arrangement, brush seal segment 24 is situated in the enclosure with bristle tips 32 adjacent outlet 40, so that an ambient pressure region exists on one side and a region of higher pressure exists adjacent the remaining portions of the pressure vessel on its opposite side. Thus, by pressurizing the pressure vessel, the region on one side of the bristles is at a higher pressure than the region on the opposite side of the bristles, the latter region being open to atmosphere through outlet 40. Leakage past the various parts of the testing apparatus between the two regions is neither significant nor adverse. It is only necessary to maintain a predetermined pressure differential across the seal between the two regions for purposes of the test.

Element 42 is adjustable relative to the top plate such that arcuate surface 44 may engage bristle tips 32 to a greater or lesser extent, as desired; that is, the actual interference between a brush seal segment and a rotor against which the segment seals can be simulated by adjusting element 42 toward or away from the bristle tips of segment 34 undergoing test. Shims 43, for example, may be used to adjust this interference. Other devices, such as screw adjustments, may be used to displace surface 44 toward and away from bristle tips 32.

The natural frequencies of the bristles can be ascertained by employment of a stroboscope in a conventional manner. Also, top and front walls 18 and 14, respectively, may comprise viewports by being formed of a clear material such that the bristles can be viewed while undergoing test. Further, various connections 50 are provided on the walls of pressure vessel 10 such that the pressure vessel can be attached to a shaker table in different orientations. Thus, at least the side, bottom and end walls have connections 50 for securing vessel 10 to the shaker table whereby the frequency testing can be conducted in three major orthogonal directions.

To employ the testing apparatus, the pressure vessel is mounted to a shaker table. Arcuate brush seal segment 44 is clamped by clamps 22 to back wall 16 of the vessel and between end supports 34 and 36. With element 42 secured to top wall 18, the top wall is secured to the pressure vessel with arcuate surface 44 of element 42 engaging the tips of the bristles. By employing, e.g., various shims for element 42, the interference between arcuate surface 44 and the bristle tips during use can be adjusted to simulate the actual interference between a brush seal, a segment of which is being tested, and a rotor. With the pressure vessel closed except for opening 40, the vessel is pressurized, providing a pressure difference between regions on opposite sides of seal segment 34. The shaker table is then swept through the frequency range of interest. When the shaker frequency matches the natural frequencies of the seal segment, the excitations of the bristles are captured through various viewing ports or through one or more sides of the enclosure formed of clear material. With this arrangement, the natural frequencies of the brush seal is determined under pressure loading so that the natural frequencies of the brush seal can be determined at the anticipated pressure loadings on the brush seal.

Further, the natural frequencies of the seal can be measured under various radial interferences. That is, a brush seal typically engages a rotor with a certain magnitude of radial force which also alters the natural frequencies of the brush seal in actual use. By adjusting element 42 to apply a similar radial force to the bristle tips as in the actual brush seal, the natural frequencies of the brush seal under this radial loading can be determined. This can be accomplished either with or without pressure loading, i.e., a differential pressure across the seal.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. Natural frequency testing apparatus for a brush seal comprising:

an enclosure having a mount;

an arcuate brush seal segment carried by said mount, said brush seal segment including a plurality of bristles carried on at least one backing plate, with the bristles extending freely therefrom terminating in bristle tips;

an element within said enclosure having an arcuate surface for engaging the bristle tips, said element and said brush seal segment defining a seal between two regions on opposite sides of said seal at different pressures, respectively, so as to differential pressure load said brush seal segment; and a connection carried by said enclosure for coupling the enclosure to a shaker whereby the enclosure and the brush seal segment mounted therein can be vibrated through a range of frequencies to ascertain a natural frequency of the brush seal segment under said differential pressure loading.

2. Apparatus according to claim 1 including connections carried by said enclosure for vibrating the enclosure about three orthogonally-related axes.

3. Apparatus according to claim 1 including a plurality of viewports through said enclosure for ascertaining the natural frequency of the bristles in said frequency range and at said differential pressure load.

4. Apparatus according to claim 1 wherein said element is adjustably mounted within said enclosure for adjusting the interference between said arcuate surface and said bristle tips whereby the natural frequency of the brush seal segment is ascertained at different interferences between said surface and said bristle tips.

5. Natural frequency testing apparatus for a brush seal comprising:

an enclosure having a mount;

an arcuate brush seal segment carried by said mount and within said enclosure, said brush seal segment including a plurality of bristles carried on a pair of backing plates with the bristles extending freely therefrom and terminating in bristle tips;

an element within said enclosure having an arcuate surface for engaging the bristle tips and positionable within said enclosure for adjusting interference between said arcuate surface and said bristle tips; and a connection carried by said enclosure for coupling the enclosure to a shaker whereby the enclosure and the brush seal segment mounted therein can be vibrated through a range of frequencies to ascertain a natural frequency of the brush seal segment under different interferences between said surface and said bristle tips.

6. Apparatus according to claim 5 including connections carried by said enclosure for vibrating the enclosure about three orthogonally-related axes.

7. Apparatus according to claim 5 including a plurality of viewports through said enclosure for ascertaining the natural frequency of the bristles in said range of frequencies.

8. A method of determining a natural frequency of a brush seal segment having a plurality of bristles mounted on at least one backing plate with the bristles extending freely therefrom and terminating in bristle tips, comprising the steps of:

disposing the brush seal segment in a pressure vessel with the bristle tips engaging along an element so as to define a seal therewith and between regions on opposite sides of the seal at different pressures, respectively, affording a differential pressure across said seal; and shaking the pressure vessel through a range of frequencies to determine a natural frequency of the brush seal segment at said differential pressure.

9. A method according to claim 8 including altering the pressure differential across the seal to a second differential pressure, shaking the pressure vessel through a range of frequencies and determining a natural frequency of the brush seal segment at said second differential pressure.

10. A method according to claim 8 including adjusting interference between said bristle tips and the element, and determining a natural frequency of the seal at said differential pressure and adjusted interference.

11. A method of determining a natural frequency of a brush seal segment having a plurality of bristles mounted on at least one backing plate, with the bristles extending freely therefrom and terminating in bristle tips, comprising the steps of:

disposing the brush seal segment in a fixture with the bristle tips engaging along an element defining a magnitude of interference therewith; and determining a natural frequency of the brush seal segment at said magnitude of interference between the brush seal segment and element.

12. A method according to claim 11 wherein the step of determining a natural frequency of the brush seal segment includes shaking the fixture through a range of frequencies.

13. A method according to claim 11 including adjusting the interference between the brush seal segment and the element to a second magnitude of interference different than said first magnitude of interference; and determining a natural frequency of the brush seal segment at said second magnitude of interference between the bristles and element.

14. A method according to claim 13 wherein the step of determining a natural frequency of the brush seal segment includes shaking the fixture through a range of frequencies.

* * * * *